(12) United States Patent
Faass

(10) Patent No.: US 6,224,063 B1
(45) Date of Patent: May 1, 2001

(54) SEAL PACK

(75) Inventor: Ian J. Faass, Burlington, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/145,326

(22) Filed: Sep. 1, 1998

(51) Int. Cl.[7] .................................................. F16J 15/54
(52) U.S. Cl. ........................ 277/371; 285/121.6; 285/190; 285/272
(58) Field of Search .................................. 277/368, 371, 277/401, 616, 366; 285/121.3, 121.6, 190, 272

(56) References Cited

U.S. PATENT DOCUMENTS

| | | |
|---|---|---|
| 1,704,003 | 3/1929 | Johnson . |
| 2,402,114 | 6/1946 | Le Clair . |
| 2,941,825 | 6/1960 | Heinrich . |
| 3,090,629 | 5/1963 | Lee et al. . |
| 3,206,229 * | 9/1965 | Kramer .............................. 277/616 X |
| 3,554,567 | 1/1971 | Carroll et al. . |
| 3,578,111 | 5/1971 | Miller . |
| 3,810,635 | 5/1974 | Richter . |
| 3,917,288 | 11/1975 | Huber et al. . |
| 4,299,396 | 11/1981 | Becker et al. . |
| 4,381,867 | 5/1983 | Ohgoshi . |
| 4,522,410 | 6/1985 | Holzer . |
| 4,796,896 | 1/1989 | Anderson, Jr. . |
| 4,822,056 | 4/1989 | Bowers . |
| 5,186,475 | 2/1993 | Kawai et al. . |
| 5,433,454 | 7/1995 | Ramberg . |
| 5,568,946 | 10/1996 | Jackowski . |
| 5,607,167 | 3/1997 | Franckx . |
| 5,788,288 * | 8/1998 | Jostein ........................ 285/121.3 X |

FOREIGN PATENT DOCUMENTS 697951    10/1953   (GB) .

* cited by examiner

Primary Examiner—Anthony Knight
Assistant Examiner—Karlena D. Schwing
(74) Attorney, Agent, or Firm—John C. Bigler

(57) ABSTRACT

Two axially spaced seal rings are located within annular grooves of a retainer to provide a seal for use between a cylindrical shaft and a housing bore. The resulting seal pack can be positioned at a lubricant passage such that lubricant may pass between the housing and the shaft but not longitudinally along the shaft. The annular retainer is dimensioned for an interference fit with either the housing bore or the shaft, and includes at least one opening located between the annular grooves such that lubricant may pass therethrough. An intermediate portion of the annular retainer provides a lubricant channel such that lubricant can flow circumferentially, avoiding the need to orient the opening in the annular retainer.

14 Claims, 2 Drawing Sheets

SEAL PACK

BACKGROUND OF THE INVENTION

This invention relates generally to seals used between a cylindrical shaft and a bore of a housing and, more particularly, to seals used to isolate a lubricant path between the housing and the shaft.

In automobile transmissions as well as other applications, lubricant may be required to flow between a lubricant passage within a housing and a lubricant passage within a shaft located in a bore of the housing. For example, the lubricant may be used for lubricating bearings, gear sets and one-way clutches, and for actuating multi-plate clutch packs. Typically, two separate seals are used between the housing bore and the shaft to prevent the lubricant from flowing axially along the bore of the housing over the outside surface of the shaft.

Present designs generally require grooves to be machined in the shaft to form a seat for the seals and to provide a circumferential lubricant path, thereby reducing the strength of the shaft and requiring costly machining. In addition, such designs may not be suitable for automated assembly and may result in wear or leakage of the seals. Furthermore, those designs may not be suitable for applications where the shaft or housing is made of aluminum or other material without acceptable wear properties for sealing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a seal pack to be positioned between a housing bore and a cylindrical shaft located within the housing bore. The seal pack comprises an annular retainer dimensioned for an interference fit with one of the housing bore and the shaft, and has two axially spaced apart annular grooves facing and radially spaced from the other of the housing bore and the shaft. The annular retainer includes at least one opening located between the annular grooves such that lubricant may pass therethrough. A resilient seal ring is located within each annular groove of the annular retainer and dimensioned for sealing engagement with the annular retainer and with said other of the housing bore and the shaft.

In another aspect of the invention, this accomplished by providing a combination of a housing, a cylindrical shaft within a bore of the housing, and a seal pack between the housing and the shaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
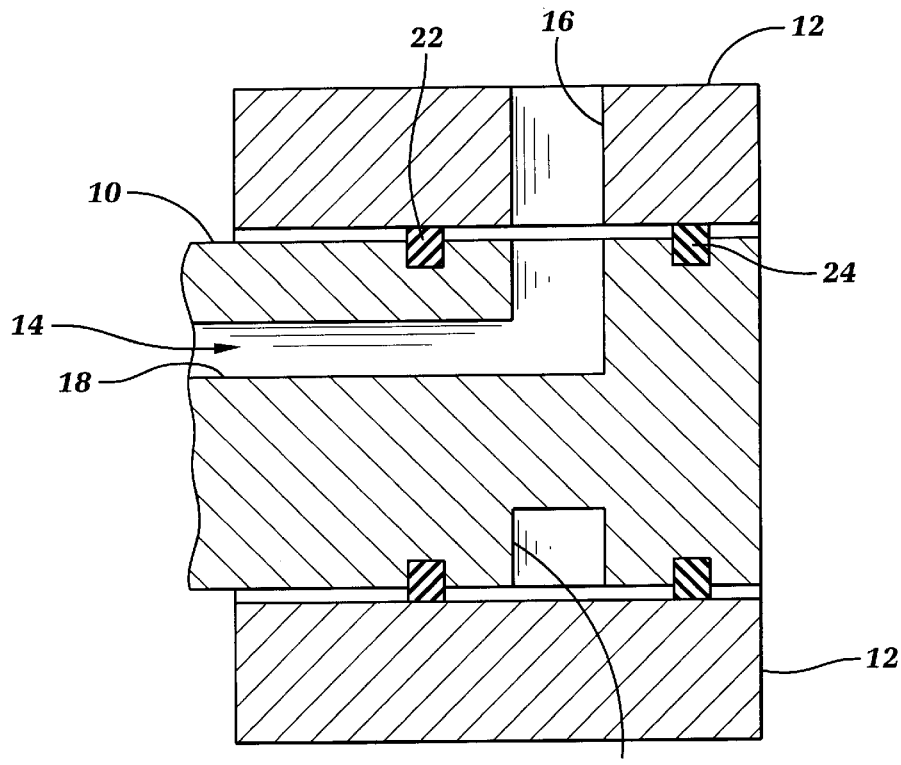
FIG. 1 is a cross-sectional view illustrating seals between a housing and a cylindrical shaft in a manner typical of the prior art.

Referring now to the drawings, FIG. 1 illustrates a cylindrical shaft 10 positioned within a bore of a housing 12 such that a lubricant channel 14 of shaft 10 communicates with lubricant channel 16 of housing 12 in a manner typical of the prior art. Lubricant channel 14 is formed by a longitudinal bore 18 intersecting an annular groove 20. Two annular resilient seals 22 and 24 are positioned in annular grooves on the outside surface of shaft 10, in sealing engagement with the annular grooves of the shaft and with the bore of housing 12, to prevent lubricant from moving axially along the surface of shaft 10.

Figure 2:
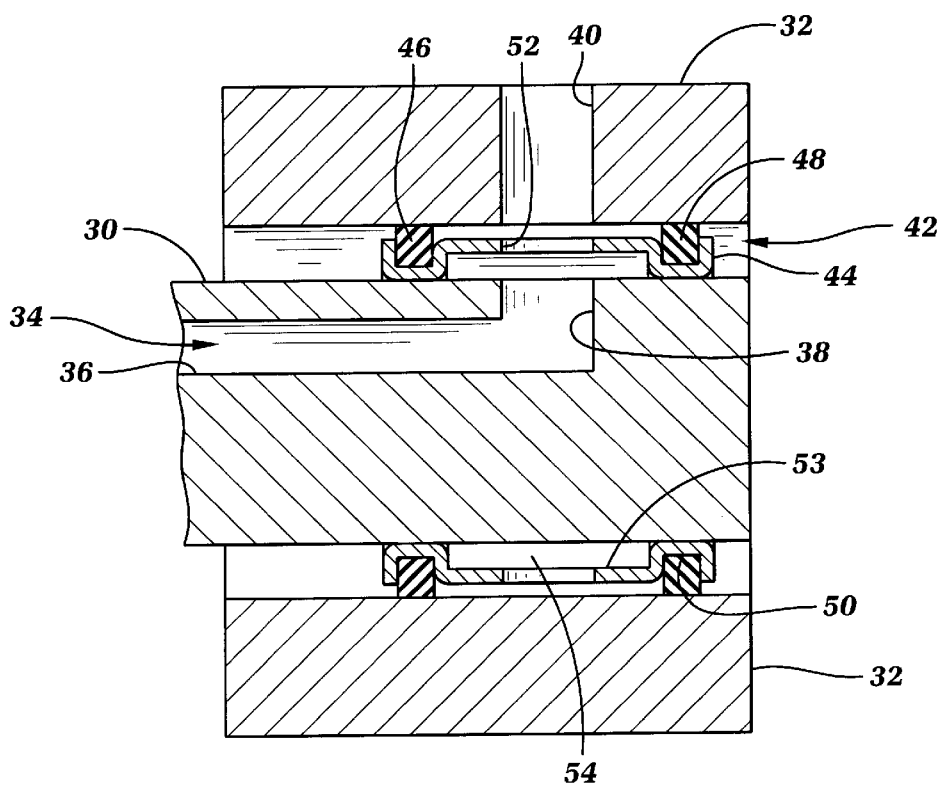
FIG. 2 is a cross-sectional view illustrating an embodiment of the seal pack of the present invention positioned between a housing and a cylindrical shaft.

FIG. 2 illustrates an embodiment of the present invention having a cylindrical shaft 30 positioned within a housing 32. A lubricant channel 34 of shaft 30 is formed by a longitudinal bore 36 intersecting a radial bore 38 and communicates with a lubricant channel 40 of housing 32. Instead of having seals recessed within the shaft, a seal pack 42 is positioned between shaft 30 and housing 32. The seal pack comprises an annular retainer 44 and two resilient annular seal rings 46 and 48 positioned within annular grooves 50 of the annular retainer for sealing against the annular retainer and the housing. At least one opening 52 in annular retainer 44, located between the annular grooves 50, allows lubricant to flow between lubricant channel 34 of shaft 30 and lubricant channel 40 of housing 32.

Preferably, an intermediate portion 53 of annular retainer 44 is radially spaced from shaft 30 to provide a circumferential lubricant channel and lubricant reservoir 54. Intermediate portion 53 is also radially spaced from housing 32, allowing lubricant to flow circumferentially between annular retainer 44 and housing 32. As a result of this configuration, and due to the positioning of opening 52 within intermediate portion 53, the installation of seal pack 42 is simplified. Orientation of opening 52 is not required; that is, annular retainer 44 may be positioned without regard to the location of radial bore 38 of the shaft or lubricant channel 40 of housing 32.

In the embodiment of FIG. 2, annular retainer 44 forms an interference fit with shaft 30 and is pressed onto the shaft from one end. Annular retainer 44 is dimensioned such that the amount of interference produces sufficient radial tension to securely maintain annular retainer 44 in axial position on the shaft, in view of anticipated thermal expansion of the retainer, the shaft and the housing, and within the limits of the hoop strength of the retainer. If desired, optional shoulders may be provided on the shaft or housing, or hollow shafts (tubes) or other means may be used to axially locate seal pack 42 along the shaft or housing.

Annular retainer 44 may have various configurations and may be formed by machining, by molding or by sheetmetal forming. In the illustrated embodiments, annular retainer 44 is made of sheetmetal of a uniform thickness that is formed into two U-shaped channels connected by a cylindrical bridge section. The opening (or openings) 52 may be a single slot or series of slots located about the circumference of annular retainer 44, provided that the total cross-sectional area of the openings is sufficient to provide the desired flow of lubricant, preferably at least equal to the cross-sectional area of lubricant channels 34 and 40.

Figure 3:
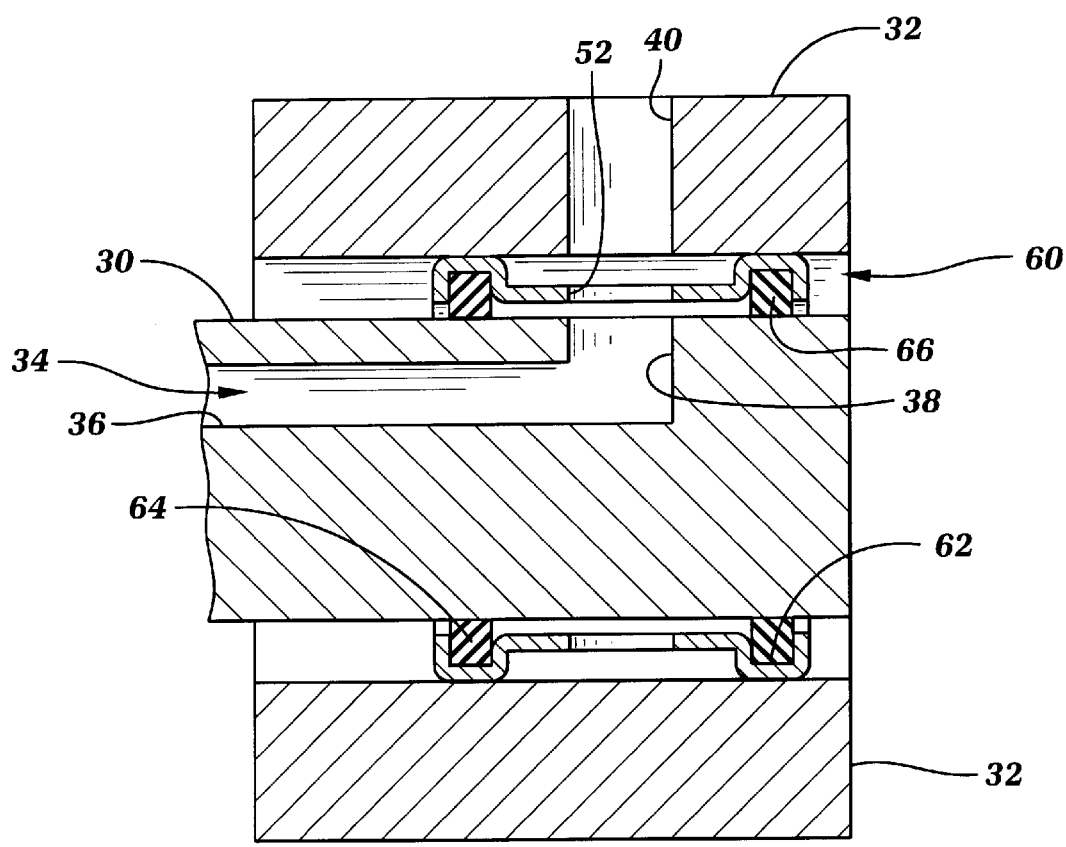
FIG. 3 is a cross-sectional view illustrating a second embodiment of the seal pack of the present invention positioned between a housing and a cylindrical shaft.

FIG. 3 illustrates another embodiment of the present invention similar to that of FIG. 2 but having an annular retainer 60 forming an interference fit with housing 32 instead of with shaft 30. Annular grooves 62 of annular retainer 60 face radially inwardly toward the shaft instead of radially outwardly toward the housing, as in FIG. 2. Resilient seal rings 64 and 66 are positioned in annular grooves 62 to seal against annular retainer 60 and against the shaft. The embodiment selected for a particular application depends upon the materials used and whether the shaft or the housing rotates. For example, the embodiment of FIG. 2 may be preferred when the housing rotates and the shaft is made of aluminum.

Annular retainers 42 and 60 may be made of metal or of a polymer having sufficient hoop strength and rigidity to secure the retainer axially against the shaft or housing. Seal rings 46, 48, 64 and 66 may be of various types depending upon the pressure requirements of the application: O-ring, continuous ring, lip seal, labyrinth seal, etc. For example, the annular retainer could be made of carbon steel used with resilient seal rings made of Hytrel (available from DuPont, Wilmington, DE), or the annular retainer could be made of polyetheretherketone (PEEK, used with or without a filler) used with resilient seal rings made of rubber.

Compared to the prior art, the present invention provides material savings because a smaller shaft may be used and provides machining savings because no grooves are required in the shaft and because the shaft may be used as cast, forged or drawn. Additionally, this design allows for quicker automated assembly and provides better performance with less wear and leakage. The design is especially well suited for use with aluminum shafts or aluminum housings that don't have acceptable wear properties for traditional sealing arrangements.

What is claimed is:

1. A seal pack to be positioned between a housing bore and a cylindrical shaft located within the housing bore, the seal pack comprising:
   an annular retainer dimensioned for an interference fit with one of the housing bore and the shaft, the annular retainer having two axially spaced apart annular grooves to be facing and radially spaced from the other of the housing bore and the shaft, the annular retainer including at least one opening located between the annular grooves such that lubricant may pass therethrough; and
   a resilient seal ring located within each annular groove of the annular retainer and dimensioned for sealing engagement with the annular retainer and with said other of the housing bore and the shaft.

2. The seal peak according to claim 1, wherein the annular retainer is dimensioned for an interference fit with the housing and the annular grooves face radially inwardly.

3. The seal peak according to claim 1, wherein the annular retainer includes an intermediate portion dimensioned to provide radial space with respect to the shaft and the housing such that lubricant may flow circumferentially to the opening of the annular retainer.

4. The seal pack according to claim 1, wherein the annular retainer is formed of sheetmetal.

5. The seal pack according to claim 1, wherein the annular retainer is made of a polymer.

6. The seal pack according to claim 1, wherein the annular retainer has a series of slots distributed circumferentially and positioned between the annular grooves of the annular retainer, thereby providing said at least one opening.

7. A combination comprising:
   a housing having a bore and a lubricant passage to the bore;
   a cylindrical shaft located within the housing bore and having a lubricant passage; and
   a seal pack including an annular retainer and two resilient annular seal rings;
   the annular retainer forming an interference fit with one of the housing bore and the shaft and having two axially spaced apart annular grooves facing and radially spaced from the other of the housing bore and the shaft, the annular retainer including at least one opening located between the annular grooves such that lubricant may pass therethrough;
   one of the resilient seal rings being located within each annular groove of the annular retainer and being in sealing engagement with the annular retainer and with said other of the housing bore and the shaft.

8. The combination according to claim 7, wherein the annular retainer forms an interference fit with the housing and the annular grooves face radially inwardly.

9. The combination according to claim 7, wherein the annular retainer includes an intermediate portion radially spaced with respect to the shaft and the housing such that lubricant may flow circumferentially between the lubricant passage of the shaft and the opening of the annular retainer and between the lubricant passage of the housing and the opening of the annular retainer.

10. The combination according to claim 7, wherein the annular retainer is formed of sheetmetal.

11. The combination according to claim 7, wherein the annular retainer is made of a polymer.

12. The combination according to claim 7, wherein the annular retainer has a series of slots distributed circumferentially and positioned between the annular grooves of the annular retainer, thereby providing said at least one opening.

13. A seal pack to be positioned between a housing bore and a cylindrical shaft located within the housing bore, the seal pack comprising:
   an annular retainer dimensioned for an interference fit with one of the housing bore and the shaft, the annular retainer having two axially spaced apart annular grooves to be facing and radially spaced from the other of the housing bore and the shaft, the annular retainer including at least one opening located between the annular grooves such that lubricant may pass therethrough; and
   a resilient seal ring located within each annular groove of the annular retainer and dimensioned for sealing engagement with the annular retainer and with said other of the housing bore and the shaft, wherein the annular retainer is dimensioned for an interference fit with the shaft and the annular grooves face radially outwardly.

14. A combination comprising:
   a housing having a bore and a lubricant passage to the bore;
   a cylindrical shaft located within the housing bore and having a lubricant passage; and
   a seal pack including an annular retainer and two resilient annular seal rings;
   the annular retainer forming an interference fit with one of the housing bore and the shaft and having two axially spaced apart annular grooves facing and radially spaced from the other of the housing bore and the shaft, the annular retainer including at least one opening located between the annular grooves such that lubricant may pass therethrough;
   one of the resilient seal rings being located within each annular groove of the annular retainer and being in sealing engagement with the annular retainer and with said other of the housing bore and the shaft, wherein the annular retainer forms an interference fit with the shaft and the annular grooves face radially outwardly.

* * * * *